(12) United States Patent
Bernardini et al.

(10) Patent No.: US 7,378,122 B2
(45) Date of Patent: May 27, 2008

(54) TRI-GUM BLEND

(75) Inventors: Deborah Bernardini, Yorktown Heights, NY (US); Sharon Chait, White Plains, NY (US); Chris Graham, Sandy Hook, CT (US); Laura Hansen, White Bear Lake, MN (US); Richard Zang, Sandy Hook, CT (US)

(73) Assignee: Pepsico, Inc., Purchase, NY (US)

( * ) Notice: Subject to any disclaimer, the term of this patent is extended or adjusted under 35 U.S.C. 154(b) by 209 days.

(21) Appl. No.: 10/865,753

(22) Filed: Jun. 14, 2004

(65) Prior Publication Data

US 2004/0265464 A1 Dec. 30, 2004

Related U.S. Application Data

(60) Provisional application No. 60/478,044, filed on Jun. 11, 2003.

(51) Int. Cl.
*A23L 2/52* (2006.01)

(52) U.S. Cl. ............... 426/573; 426/519; 426/520; 426/590; 426/599

(58) Field of Classification Search ............ 426/573, 426/590, 599, 519, 520
See application file for complete search history.

(56) References Cited

U.S. PATENT DOCUMENTS

| | | | |
|---|---|---|---|
| 4,746,528 A | 5/1988 | Prest et al. ............... 426/573 |
| 5,376,396 A | 12/1994 | Clark | |
| 5,538,751 A | 7/1996 | Carter et al. ............... 426/661 |
| 5,579,604 A * | 12/1996 | Holung et al. ............... 49/61 |
| 5,597,604 A | 1/1997 | Chalupa et al. ............ 426/590 |
| 5,616,358 A | 4/1997 | Taylor et al. ............... 426/590 |
| 5,654,027 A * | 8/1997 | Chalupa ................... 426/573 |
| 5,792,502 A | 8/1998 | Montezinos ............... 426/590 |
| 5,919,512 A | 7/1999 | Montezinos ............... 426/590 |
| 6,013,294 A | 1/2000 | Bunke et al. ............... 426/120 |
| 6,042,854 A * | 3/2000 | Morris et al. ............... 426/72 |
| 6,106,883 A | 8/2000 | Sokolik et al. ............ 426/573 |
| 6,136,356 A * | 10/2000 | Bunger et al. ........... 426/330.3 |
| 6,171,633 B1 | 1/2001 | Dulebohn et al. | |
| 6,455,090 B1 | 9/2002 | Uzuhashi et al. ........... 426/573 |
| 2003/0162746 A1* | 8/2003 | Madsen et al. ............... 514/54 |

FOREIGN PATENT DOCUMENTS

JP 2004 129596 4/2004
WO WO 2004110168 12/2004

OTHER PUBLICATIONS

Evans, Jeannette. 1997 "Primacel food applications" Research Disclosure Journall, ISSN 0374-4353, Kenneth Mason Publications LTD, The Book Barn, Westbourne, Hants. PO 10 8RS, UK, pp. 1-7.*

* cited by examiner

*Primary Examiner*—Helen F Pratt
(74) *Attorney, Agent, or Firm*—Banner & Witcoff, Ltd.

(57) ABSTRACT

A tri-gum blend of (a) xanthan gum, (b) gellan gum and (c) pectin gum is used to provide mouthfeel and stability to beverages, preferably smoothie beverages. Xanthan gum is present in an amount ranging from about 0.002% to about 0.5%, preferably from about 0.025% to about 0.055%, more preferably about 0.04%, gellan gum is present in an amount ranging from about 0.002% to about 0.5%, preferably from about 0.008% to about 0.023%, more preferably about 0.015%, and pectin gum is present in an amount ranging from about 0.05% to about 2.0%, preferably from about 0.10% to about 0.30%, more preferably about 0.2%, all by weight of a stable beverage.

34 Claims, No Drawings

TRI-GUM BLEND

The present application claims the benefit of U.S. Provisional Patent Application No. 60/478,044 filed Jun. 11, 2003.

BACKGROUND OF THE INVENTION

1. Field of the Invention

The present invention relates to stable beverages containing a particular tri-gum blend of xanthan gum, gellan gum and pectin gum. The invention further relates to a method of making stable beverages, as well as to the tri-gum blend. The invention is preferably directed to smoothie beverages and to a method of making the same.

2. Related Background Art

Smoothies are a popular class of beverages in the United States, typically comprising a variety of ingredients hand-picked by the consumer which are blended together to form a fresh, unique and healthy snack. Smoothies are known for their thick, rich mouthfeel and often employ fruit, juice, dairy, soy, vegetable, vitamin and fiber components. Heretofore, such beverages were available almost exclusively at establishments such as juice bars and restaurants, which offer a multitude of custom-made smoothie beverages. In order to expand the availability of smoothies, it is, therefore, desirable to provide a shelf-stable smoothie beverage having most of the characteristics typically associated with fresh-made smoothies.

In addition, one problem arises with the consumption of fresh-made smoothies, namely thinning and phase separation with elapse of time. In other words, there is a finite, and relatively short, time in which a fresh-made smoothie must be consumed before the beverage begins to thin and/or form a layer of water at the top or bottom of the beverage. It would, therefore, be desirable to have a smoothie beverage which does not suffer from this disadvantage, i.e., a shelf-stable smoothie beverage.

In order to develop a shelf-stable smoothie beverage, a beverage matrix capable of suspending solid materials and of providing the appropriate mouthfeel is required. In this regard, gums including xanthan gum, gellan gum and pectin gum are well-known thickening agents in the food and beverage industry. See, for example, U.S. Pat. No. 6,455,090 (directed to a liquid additive thickener containing xanthan, pectin or any one of a number of other gums, which may be used in combination with guar or gum arabic); U.S. Pat. No. 6,136,356 (directed to an anti-microbial beverage composition optionally containing thickeners such as xanthan, gellan, pectin, a number of other gums or combinations thereof at levels of up to 0.07%); U.S. Pat. No. 6,106,883 (directed to a method of suspending inclusions, the first step of which is forming a pre-gel solution using gellan (0.2 to 1.5%) or xanthan, pectin, a number of other gums or combinations thereof (0.1 to 1.0%); U.S. Pat. No. 6,013,294 (directed to ready-to-cook food or beverage mixes in which any of a number of gums including xanthan, gellan and pectin and combinations thereof may be used); U.S. Pat. Nos. 5,919,512 and 5,792,502 (directed to dilute juice beverages having a stable emulsion accomplished using 0.005 to 0.015% xanthan and other optional thickeners including gellan and pectin at levels of up to 0.07%); U.S. Pat. No. 5,616,358 (directed to stable beverages having an oil-in-water emulsion, xanthan, pectin and a number of other gums, as well as mixtures thereof, as possible stabilizers and xanthan, gellan, pectin, a number of other gums, and mixtures thereof as potential thickeners to be used in amounts of 0.0025% to 0.20%); U.S. Pat. No. 5,597,604 (directed to a stable pourable beverage containing gellan (0.01% to 0.15%) and xanthan, pectin and other gums as optional thickeners in large amounts); U.S. Pat. No. 5,538,751 (directed to a thickened foodstuff containing non-pregelatinized amylose polymer and a biopolymer comprising xanthan, pectin, a number of other gums or combinations thereof); and U.S. Pat. No. 4,746,528 (directed to a gellable composition comprising (a) gellan, (b) xanthan and (c) galactomannan or glucomarnan).

SUMMARY OF THE INVENTION

The present invention is directed to a method of producing a beverage comprising the steps of: (a) dispersing xanthan gum, gellan gum and pectin gum in hot water to produce a gum solution by adding xanthan gum, gellan gum and pectin gum separately or in any combination to the hot water while the hot water is agitated under high-shear conditions, wherein a temperature of the hot water in step (a) is at least 110° F.; (b) cooling the gum solution to a temperature at which loss of flavor volatiles contained in a flavor to be added in step (c) is minimized; (c) combining other beverage ingredients including flavor with the gum solution to produce a beverage; and (d) activating the gellan gum by heating the beverage to a temperature of at least 180° F.; wherein xanthan gum is present in an amount ranging from about 0.002% to about 0.5% by weight of the beverage, gellan gum is present in an amount ranging from about 0.002% to about 0.5% by weight of the beverage and pectin gum is present in an amount ranging from about 0.05% to about 2.0% by weight of the beverage. The invention is also directed to beverages made according to this method.

The present invention is further directed to a beverage comprising: (a) xanthan gum in an amount ranging from about 0.002% to about 0.5% by weight of the beverage; (b) gellan gum in an amount ranging from about 0.002% to about 0.5% by weight of the beverage; and (c) pectin gum in an amount ranging from about 0.05% to about 2.0% by weight of the beverage.

Preferred embodiments of the invention are those in which the beverage is stable, those in which the beverage is a smoothie beverage, more preferably a fruit smoothie beverage, those in which other beverage ingredients present are selected from sweeteners, acids, vitamins, fiber, fruit juice, fruit puree, milk, milk solids, milk proteins, soy milk, soy proteins, egg proteins, albumins, microbial proteins, fish proteins, plant proteins, dairy whey proteins, non-dairy whey proteins, vegetable whey proteins, coffee, coffee solids, vegetable juice, vegetable puree, tea, tea solids, preservatives, buffers, colors, flavors, and combinations thereof and those in which xanthan gum is present in an amount preferably ranging from about 0.025% to about 0.055%, more preferably about 0.04%, gellan gum is present in an amount preferably ranging from about 0.008% to about 0.023%, more preferably about 0.015%, and pectin gum is present in an amount preferably ranging from about 0.10% to about 0.30%, more preferably about 0.2%, all by weight of the beverage.

The present invention is still further directed to a tri-gum blend consisting essentially of: (a) xanthan gum; (b) gellan gum; and (c) pectin gum; wherein a ratio of xanthan: gellan : pectin ranges from about 0.04-10:0.04-10:1 to about 0.001-0.25:0.001-0.25:1, preferably from 0.25-0.55:0.08-0.23:1 to about 0.083-0.183:0.0267-0.0767:1, and more preferably about 0.2:0.075:1.

DETAILED DESCRIPTION

The present invention relates to the use of a tri-gum blend to provide both a smooth, thick texture and stability to a variety of shelf-stable beverages, preferably smoothie beverages. The tri-gum blend contains xanthan, gellan and pectin in specified amounts. The inventive blend creates a smooth shelf-stable beverage which has a desirable thick and even texture; in addition, the present inventive blend successfully suspends pulp and/or any other solids throughout the beverage and prevents sedimentation and/or separation.

As used herein, "beverage" refers to, without limitation, smoothie beverages, protein drinks, shakes, vegetable juice drinks, fruit juice drinks, dairy-based drinks, coffe- and tea-based drinks and any other beverage to which a degree of thickness and/or stability is desirable; "beverage" also refers to any drink which contains suspended solids. As used herein, "smoothie" and "smoothie beverage" are used interchangeably; likewise "xanthan" and "xanthan gum" are used interchangeably, "gellan" and "gellan gum" are used interchangeably, and "pectin" and "pectin gum" are used interchangeably. The term "smoothie beverage" denotes a readily discernible class of beverages to one of ordinary skill in this art; in addition to encompassing any such readily discernible member of that class, as used herein, "smoothie beverage" particularly refers to a beverage with a characteristic thickness which can be attributed to the presence therein of ingredients such as sweeteners, acids, vitamins, fiber, fruit juice, fruit puree, milk, milk solids, milk proteins, soy milk, soy proteins, coffee, coffee solids, vegetable juice, vegetable puree, tea, tea solids, preservatives, buffers, colors, flavors, and combinations thereof. Smoothie beverages may be fruit-based, juice-based, dairy-based, coffee-based, soy-based, whey-based, vegetable-based, tea-based or a combination thereof. A "fruit- smoothie beverage" is a smoothie which is fruit-based, juice-based or a combination thereof. As used herein, "stable" refers to the absence of sedimentation, phase separation, striation, etc., preferably for a period of at least 6 months. As used herein, "shelf-stable" refers to an inability to support the growth of microorganisms at typical distribution temperatures over the course of shelf life, preferably over the course of at least 6 months; one of ordinary skill in this art will readily appreciate that the stable beverages of the present invention may not be shelf-stable in extreme or abusive environmental conditions. As used herein, "high shear" refers to a shear rate of at least at least 50,000 $sec^{-1}$.

Without being bound to theory, it is believed that the present inventive gum blend is highly successful in providing a smooth, thick texture and stability to beverages, in particular to smoothie beverages, due to its behavior in the beverage matrix. In particular, it is believed that in the built-up composite, each gum fills in some space in the beverage matrix. According to the present invention, xanthan, gellan and pectin create a near perfect system for smoothie beverages.

The first embodiment of the present invention is directed to a method of producing a beverage comprising the steps of: (a) dispersing xanthan gum, gellan gum and pectin gum in hot water to produce a gum solution by adding xanthan gum, gellan gum and pectin gum separately or in any combination to the hot water while the hot water is agitated under high-shear conditions, wherein a temperature of the hot water in step (a) is at least 110° F.; (b) cooling the gum solution to a temperature at which loss of flavor volatiles contained in a flavor to be added in step (c) is minimized; (c) combining other beverage ingredients including flavor with the gum solution to produce a beverage; and (d) activating the gellan gum by heating the beverage to a temperature of at least 180° F.; wherein xanthan gum is present in an amount ranging from about 0.002% to about 0.5% by weight of the beverage, gellan gum is present in an amount ranging from about 0.002% to about 0.5% by weight of the beverage and pectin gum is present in an amount ranging from about 0.05% to about 2.0% by weight of the beverage.

In the first step of this embodiment of the invention, xanthan gum, gellan gum, and pectin gum are dispersed in hot water which is continuously agitated under high-shear conditions in order to produce a gum solution. The three gums may be added separately in any order or in any combination, i.e., xanthan and gellan, then pectin; xanthan and then gellan and pectin, etc. In a preferred embodiment of the present invention, step (a) of the present inventive method comprises the steps of, in this order: (a1) dissolving xanthan gum in hot water to produce a hot xanthan solution by adding the xanthan gum to the hot water while the hot water is agitated under high-shear conditions; (a2) dispersing gellan gum into the hot xanthan solution to produce a hot xanthan/gellan solution by adding gellan gum to the hot xanthan solution while the hot xanthan solution is agitated under high-shear conditions; and (a3) dissolving pectin gum in the hot xanthan/gellan solution to produce a gum solution by adding pectin gum to the hot xanthan/gellan solution while the hot xanthan/gellan solution is agitated under high-shear conditions. Generally, a slow addition, i.e., over the course of about one to about five minutes, preferably about two minutes, of each of the gums separately to the hot water facilitates dissolution, dispersion and hydration of the gums.

Without being bound to theory, it is believed that both the xanthan and the pectin gums are dissolved, i.e., fully hydrated, upon dispersion during step (a); on the contrary, while the gellan gum is partially dissolved, i.e., partially hydrated, dispersion is a more appropriate term to describe the introduction of gellan gum to the hot water in step (a) because the gellan gum is not completely hydrated during this step. Accordingly, for purposes of this invention, "dispersion" or "dispersing" includes some degree of dissolution, but also includes simple wetting of dry material.

Typically the gums are added to the hot water in a high shear mix tank. However, any vessel in which high shear conditions can be obtained will suffice. Preferably the hot water is high-sheared at a shear rate of at least 50,000 $sec^{-1}$, more preferably from about 100,000 $sec^{-1}$ to about 500,000 $sec^{-1}$. Slower agitation is ineffective in dissolving, dispersing and hydrating the gums, while faster agitation may be acceptable.

Water suitable for use in the present invention includes all beverage-quality water. The water must be hot in order to dissolve, disperse and hydrate the gums. What is more, the temperature of the gum solution, whether the gums are added separately or in some combination, must be maintained to dissolve, disperse and hydrate all three gums. Further, it is important to note that the desired temperature can be achieved by using pre-heated water, by supplying heat to the vessel in which dissolution will occur or by any other possible means.

The temperature of the hot water or any intermediate gum solution formed in this first step of the present inventive method is at least 110° F. Preferably this temperature ranges from about 115° F. to about 120° F., and more preferably is about 115° F. Lower temperatures are ineffective to dissolve, disperse and hydrate the gums, while temperatures greater than 120° F. begin to decrease the viscosity that can be achieved with the present inventive tri-gum blend. It is important to note, however, that such decreased viscosity may be desirable in the formulation of particular beverages and that one of ordinary skill in this art could readily determine a suitable hot water temperature given this information.

Any commercially available xanthan gum may be used in the present invention. Keltrol RD (CP Kelco) is one such commercially available and preferred xanthan gum. In addition, xanthan gum suitable for use in this invention may be made according to any known method. Xanthan is present in an amount ranging from about 0.002% to about 0.5%, preferably from about 0.025% to about 0.055%, and more preferably about 0.04%, by weight of the beverage.

Any commercially available high acyl gellan gum may be used in the present invention. Kelcogel LT100 (CP Kelco) is one such commercially available high acyl gellan gum. In addition, high acyl gellan gum suitable for use in this invention may be made according to any known method. Gellan is present in an amount ranging from about 0.002% to about 0.5%, preferably from about 0.008% to about 0.023%, and more preferably about 0.015%, by weight of the beverage.

Any commercially available high methoxyl pectin gum may be used in the present invention. Genu 106 BP (CP Kelco) is one such commercially available high methoxyl pectin gum. In addition, high methoxyl pectin gum suitable for use in this invention may be made according to any known method. Further, in a beverage system in which calcium is present, it is also possible to use a low methoxyl pectin gum. Pectin is present in an amount ranging from about 0.05% to about 2.0%, preferably from about 0.10% to about 0.30%, and more preferably about 0.20%, by weight of the beverage.

The amounts of the gums used in this invention, and, in particular, their weight ratio with respect to one another, is critical. Studies showed that reducing any of the gum levels (at various combinations) resulted in separation and thinning of the beverage, preferably smoothie beverage; on the other hand, increasing any of the gum levels resulted in syneresis.

The conclusion of step (a) is reached when all gums have been dispersed in the hot water. Complete dispersion can be readily determined by one of ordinary skill in the art by visual inspection, i.e., by noting the absence of dry material, clumps, and/or "fish-eyes". Of course, any method which would allow one to determine that the gums have been dissolved to the extent possible in this step can be used to determine the conclusion of step (a).

In the second step of the method of this first embodiment of the present invention, the gum solution is cooled to a temperature at which loss of flavor volatiles contained in a flavor to be added in step (c) is minimized. Generally speaking, that temperature is in the range of ambient temperature to about 90° F. One of ordinary skill in this art, however, could readily determine a suitable temperature depending on the flavor employed in a particular formulation. Cooling in this step may be accomplished by actively cooling the vessel in which the gum solution is contained, i.e., jacketing the vessel, by transferring the gum solution to another component of the beverage, i.e., additional water, which is at a lower or desired temperature, or by any other possible means.

In the third step of the first embodiment of the present invention, other beverage ingredients are combined with the gum solution to produce a beverage. Other beverage ingredients suitable for use in the present invention include, without limitation, sweeteners, acids, vitamins, fiber, fruit juice, fruit puree, milk, milk solids, milk proteins, soy milk, soy proteins, egg proteins, albumins, microbial proteins, fish proteins, plant proteins, dairy whey proteins, non-dairy whey proteins, vegetable whey proteins, coffee, coffee solids, vegetable juice, vegetable puree, tea, tea solids, preservatives, buffers, colors, flavors, and combinations thereof. It is important to note that the other beverage ingredients may be combined with one another, i.e., in a concentrate or syrup, before being combined with the gum solution; alternatively, other beverage ingredients may be added one at a time, stepwise or in any other manner typically used in the finished beverage industry. In addition, combination of the gum solution and other beverage ingredients can be accomplished in any suitable vessel. Generally, agitation during the combination step, when used, is a slower agitation than that used in step (a) above. Depending upon the overall desired viscosity of the finished beverage, use of agitation and degree of agitation may be modified in this step; this is within the skill of one of ordinary skill in this art.

The time elapsed between the start of step (a) (dispersion) and the start of step (c) (combination with other beverage ingredients) is preferably no more than about 60 minutes, and more preferably from about 30 minutes to about 45 minutes. The lower limit here is limited only by the amount of time required to dissolve, disperse and hydrate the gums, while the upper limit has a significant effect on the viscosity of the beverage achieved; an elapse of time of greater than about 60 minutes significantly reduces beverage stability.

In the final step of the present inventive method, the gellan gum is activated by heating the beverage to a temperature of at least 180° F. Preferably this temperature ranges from about 190° F. to about 198° F., and more preferably is about 194.5° F. Again, without being bound to theory, because it is believed that the gellan gum is only partially hydrated, i.e., activated, in step (a), this step is necessary to complete hydration. On the contrary, because it is believed that both the xanthan and pectin gums are fully hydrated as a result of step (a), no separate activation steps therefor are required; however, if it is determined that the xanthan and/or the pectin gum has not been fully hydrated, i.e., activated, by step (a), then it would be possible to include any appropriate activation step therefor in the present method.

It is important to note that this "final" step of the present inventive method may precede steps (b) and (c) if so desired. However, when step (d) takes place after step (c), the time elapsed between the start of step (c) (combination with other beverage ingredients) and the start of step (d) (activation) is preferably no more than about 6 hours, and more preferably from about 4 hours to about 6 hours.

An optional step which may be included in the present inventive method is a pasteurization step. It should be noted that it may be possible to simultaneously perform both the activation of step (d) and a pasteurization step. In other words, although pasteurization is a product- and package-dependent process in terms of its length and time, if pasteurization is conducted at a temperature of at least 180° F., then it would also accomplish activation of the gellan gum.

A second and related embodiment of the present invention is directed to a beverage made according to the method of the first embodiment of the present invention. The viscosity of the beverage preferably ranges from about 40 cP to about 75 cP, more preferably ranges from about 50 cP to about 60 cP, at about 80° F., as measured using a Brookfield DV-I+–LV spring spindle #1 at 60 RPM. Viscosity measurements can, however, be taken in any known manner which can be equated to a viscosity measurement taken using a Brookfield DV-I+-LV spring spindle #1 at 60 RPM.

A third embodiment of the present invention is directed to a beverage comprising: (a) xanthan gum in an amount ranging from about 0.002% to about 0.5% by weight of the beverage; (b) gellan gum in an amount ranging from about 0.002% to about 0.5% by weight of the beverage; and (c) pectin gum in an amount ranging from about 0.05% to about 2.0% by weight of the beverage. A preferred embodiment is one in which xanthan gum is present in an amount ranging from about 0.025% to about 0.055% by weight of the beverage, gellan gum is present in an amount ranging from about 0.008% to about 0.023% by weight of the beverage, and pectin gum is present in an amount ranging from about 0.10% to about 0.30% by weight of the beverage. A more preferred embodiment is one in which xanthan is present in an amount of about 0.04% by weight of the beverage, gellan is present in an amount of about 0.015% by weight of the beverage and pectin is present in an amount of about 0.2% by weight of the beverage.

The beverage may be made according to any method including that of the first embodiment of this invention. The beverage of this embodiment may also comprise other beverage ingredients. Suitable other beverage ingredients are the same as those set forth above with regard to the first embodiment of this invention. In addition, the details regarding the starting material gums and viscosity are the same as those set forth above with regard to the first and second embodiments of this invention.

In particularly preferred embodiments of the first through third embodiments of the invention, the beverage is a stable beverage as defined herein. Further particularly preferred embodiments are those in which the beverage is a smoothie beverage, more preferably a fruit smoothie beverage.

A fourth embodiment of this invention is directed to a tri-gum blend consisting essentially of (a) xanthan gum; (b) gellan gum; and (c) pectin gum, wherein a ratio of xanthan : gellan : pectin ranges from about 0.04-10:0.04-10:1 to about 0.001-0.25:0.001-0.25:1. A preferred embodiment of this invention is one in which the weight ratio of xanthan: gellan:pectin ranges from about 0.25-0.55:0.08-0.23:1 to about 0.083-0.183:0.0267-0.0767:1. A more preferred embodiment is one in which the ratio of xanthan: gellan: pectin is about 0.2:0.075:1.

The tri-gum blend is suitable for use in a variety of foods and beverages including smoothie beverages.

The examples which follow are intended as an illustration of certain preferred embodiments of the invention, and no limitation of the invention is implied.

EXAMPLE 1

Strawberry Smoothie

A strawberry smoothie beverage is made using the ingredients set forth in Table 1. The amounts given in Table 1 are weight percentages and can, therefore, be applied for any batch size.

TABLE 1

Strawberry Smoothie Ingredients.

| ingredient | weight percent (%) |
| --- | --- |
| corn syrup solids | 4.84 |
| HFCS 55 | 10.10 |

TABLE 1-continued

Strawberry Smoothie Ingredients.

| ingredient | weight percent (%) |
| --- | --- |
| xanthan - Keltrol RD | 0.04 |
| gellan - Kelcogel LT100 | 0.015 |
| pectin - 106 bp | 0.20 |
| acidulants | 0.25 |
| vitamin blend | 0.20 |
| fiber | 1.10 |
| juice concentrates | 10.96 |
| color | 0.55 |
| strawberry flavor | 0.40 |
| water | 71.34 |

Approximately 25% of the total water present in the finished smoothie is added to a high-shear mix tank and heated to a temperature of about 115° F. to 120° F. Agitation at 67% speed (40 Hz) is begun. Xanthan gum is added into the high-shear mix tank over the course of two minutes; then the solution is mixed for a minute by maintaining the above-noted agitation speed. Then, gellan gum is added into the high-shear mix tank over the course of about two minutes. Next, pectin gum is added into the high-shear mix tank. Agitation is then increased to 75% speed (45 Hz). Approximately 35% of the total water present in the finished smoothie is added to a blend tank. A slower speed agitation of the blend tank is begun. HFCS is added to the blend tank, then remaining ingredients in the form of an aqueous mixture containing approximately 5% of the total water present in the finished smoothie. The contents of the high-shear mix tank are then transferred to the blend tank, and the remaining 35% of the total water present in the finished smoothie is added to the blend tank. The mixture is agitated until mixed. Finished beverages are pasteurized at about 194.5° F. and then filled. The strawberry smoothie of this example is stable, i.e., no thinning, phase separation or syneresis, for over 6 months, and has good mouthfeel.

EXAMPLE 2

Tropical Smoothie

A tropical smoothie beverage is made using the ingredients set forth in Table 2. The amounts given in Table 2 are weight percentages and can, therefore, be applied for any batch size.

TABLE 2

Tropical Smoothie Ingredients.

| ingredient | weight percent (%) |
| --- | --- |
| corn syrup solids | 4.84 |
| HFCS 55 | 10.10 |
| xanthan - Keltrol RD | 0.04 |
| gellan - Kelcogel LT100 | 0.015 |
| pectin - 106 bp | 0.20 |
| acidulants | 0.37 |
| vitamin blend | 0.20 |
| fiber | 1.10 |
| juice concentrates | 11.07 |
| color | 0.10 |
| tropical flavor | 0.30 |
| water | 71.664 |

Approximately 25% of the total water present in the finished smoothie is added to a high-shear mix tank and heated to a temperature of about 115° F. to 120° F. Agitation at 67% speed (40 Hz) is begun. Xanthan gum is added into the high-shear mix tank over the course of two minutes; then the solution is mixed for a minute by maintaining the above-noted agitation speed. Then, gellan gum is added into the high-shear mix tank over the course of about two minutes. Next, pectin gum is added into the high-shear mix tank. Agitation is then increased to 75% speed (45 Hz). Approximately 35% of the total water present in the finished smoothie is added to a blend tank. A slower speed agitation of the blend tank is begun. HFCS is added to the blend tank, then remaining ingredients in the form of an aqueous mixture containing approximately 5% of the total water present in the finished smoothie. The contents of the high-shear mix tank are then transferred to the blend tank, and the remaining 35% of the total water present in the finished smoothie is added to the blend tank. The mixture is agitated until mixed. Finished beverages are pasteurized at about 194.5° F. and then filled. The tropical smoothie of this example is stable, i.e., no thinning, phase separation or syneresis, for over 6 months, and has good mouthfeel.

EXAMPLE 3

Citrus Smoothie

A citrus smoothie beverage is made using the ingredients set forth in Table 3. The amounts given in Table 3 are weight percentages and can, therefore, be applied for any batch size.

TABLE 3

Citrus Smoothie Ingredients.

| ingredient | weight percent (%) |
|---|---|
| corn syrup solids | 4.84 |
| HFCS 55 | 10.10 |
| xanthan - Keltrol RD | 0.04 |
| gellan - Kelcogel LT100 | 0.015 |
| pectin - 106 bp | 0.20 |
| acidulants | 0.37 |
| vitamin blend | 0.20 |
| fiber | 1.10 |
| juice concentrates | 11.07 |
| color | 0.05 |
| citrus flavor | 0.18 |
| water | 71.834 |

Approximately 25% of the total water present in the finished smoothie is added to a high-shear mix tank and heated to a temperature of about 115° F. to 120° F. Agitation at 67% speed (40 Hz) is begun. Xanthan gum is added into the high-shear mix tank over the course of two minutes; then the solution is mixed for a minute by maintaining the above-noted agitation speed. Then, gellan gum is added into the high-shear mix tank over the course of about two minutes. Next, pectin gum is added into the high-shear mix tank. Agitation is then increased to 75% speed (45 Hz). Approximately 35% of the total water present in the finished smoothie is added to a blend tank. A slower speed agitation of the blend tank is begun. HFCS is added to the blend tank, then remaining ingredients in the form of an aqueous mixture containing approximately 5% of the total water present in the finished smoothie. The contents of the high-shear mix tank are then transferred to the blend tank, and the remaining 35% of the total water present in the finished smoothie is added to the blend tank. The mixture is agitated until mixed. Finished beverages are pasteurized at about 194.5° F. and then filled. The citrus smoothie of this example is stable, i.e., no thinning, phase separation or syneresis, for over 6 months, and has good mouthfeel.

Other variations and modifications of this invention will be obvious to those skilled in this art. This invention is not to be limited except as set forth in the following claims.

What is claimed is:

1. A method of producing a beverage comprising the steps of:
  (a) dispersing xanthan gum, gellan gum and pectin gum in hot water to produce a gum solution by adding xanthan gum, gellan gum and pectin gum separately or in any combination to the hot water while the hot water is agitated under high shear conditions, wherein a temperature of the hot water is at least 110° F.;
  (b) cooling the gum solution to a temperature at which loss of flavor volatiles contained in a flavor to be added in step (c) is minimized;
  (c) combining other beverage ingredients including flavor with the gum solution to produce a beverage; and
  (d) activating the gellan gum by heating the beverage to a temperature of at least 180° F.;
  wherein xanthan gum is present in an amount ranging from about 0.0002% to about 0.5% by weight of the beverage, gellan gum is present in an amount ranging from about 0.002% to about 0.5% by weight of the beverage and pectin gum is present in an amount ranging from about 0.05% to about 2.0% by weight of the beverage.

2. The method according to claim 1, wherein step (a) comprises the steps of, in this order:
  (a1) dissolving xanthan gum in hot water to produce a hot xanthan solution by adding the xanthan gum to the hot water while the hot water is agitated under high shear conditions;
  (a2) dispersing gellan gum into the hot xanthan solution to produce a hot xanthan/gellan solution by adding gellan gum to the hot xanthan solution while the hot xanthan solution is agitated under high shear conditions; and
  (a3) dissolving pectin gum in the hot xanthan/gellan solution to produce a gum solution by adding pectin gum to the hot xanthan/gellan solution while the hot xanthan/gellan solution is agitated under high shear conditions.

3. The method according to claim 1, wherein the temperature of the hot water in step (a) ranges from about 115° F. to about 120° F.

4. The method according to claim 1, wherein the temperature of the hot water in step (a) is about 115° F.

5. The method according to claim 1, wherein the hot water is agitated at a shear rate of at least 50,000 sec$^{-1}$.

6. The method according to claim 5, wherein the hot water is agitated at a shear rate ranging from about 100,000 sec$^{-1}$ to about 500,000 sec$^{-1}$.

7. The method according to claim 1, wherein the temperature in step (b) ranges from ambient to about 90° F.

8. The method according to claim 1, wherein the other beverage ingredients are selected from the group consisting of sweeteners, acids, vitamins, fiber, fruit juice, fruit puree, milk, milk solids, milk proteins, soy milk, soy proteins, egg proteins, albumins, microbial proteins, fish proteins, plant proteins, dairy whey proteins, non-dairy whey proteins, vegetable whey proteins, coffee, coffee solids, vegetable juice, vegetable puree, tea, tea solids, preservatives, buffers, colors, flavors, and combinations thereof.

9. The method according to claim 1, wherein a time between the beginning of step (a) and the beginning of step (c) is no more than about 60 minutes.

10. The method according to claim 9, wherein the time between the beginning of step (a) and the beginning of step (c) ranges from about 30 minutes to about 45 minutes.

11. The method according to claim 1, wherein a time between the beginning of step (c) and the beginning of step (d) is no more than about 6 hours.

12. The method according to claim 11, wherein the time between the beginning of step (c) and the beginning of step (d) ranges from about 4 hours to about 6 hours.

13. The method according to claim 1, wherein the temperature in step (c) ranges from about 190° F. to about 198° F.

14. The method according to claim 1, wherein the temperature in step (c) is about 194.5°.

15. The method according to claim 1, wherein xanthan gum is present in an amount ranging from about 0.025% to about 0.055% by weight of the beverage, gellan gum is present in an amount ranging from about 0.008% to about 0.023% by weight of the beverage and pectin gum is present in an amount ranging from about 0.10% to about 0.30% by weight of the beverage.

16. The method according to claim 15, wherein xanthan gum is present in an amount of about 0.04% by weight of the beverage, gellan gum is present in an amount of about 0.015% by weight of the beverage and pectin gum is present in an amount of about 0.2% by weight of the beverage.

17. The method according to claim 1, wherein the beverage is stable for a period of at least six months.

18. The method according to claim 1, wherein the beverage is a smoothie beverage.

19. The method according to claim 18, wherein the smoothie beverage is a fruit smoothie beverage.

20. A beverage made according to the method of claim 1.

21. The beverage according to claim 20, wherein a viscosity of the beverage ranges from about 40 cP to about 75 cP at about 80° F.

22. The beverage according to claim 21, wherein the viscosity of the beverage ranges from about 50 cP to about 60 cP at about 80° F.

23. A beverage comprising:
 (a) xanthan gum in an amount ranging from about 0.002% to about 0.5% by weight of the beverage;
 (b) gellan gum in an amount ranging from about 0.002% to about 0.5% by weight of the beverage; and
 (c) pectin gum in an amount ranging from about 0.05% to about 2.0% by weight of the beverage;
 wherein a viscosity of the beverage ranges from about 40 cP to about 75 cP at about 80° F.

24. The beverage according to claim 23 further comprising other beverage ingredients selected from the group consisting of sweeteners, acids, vitamins, fiber, fruit juice, fruit puree, milk, milk solids, milk proteins, soy milk, soy proteins, egg proteins, albumins, microbial proteins, fish proteins, plant proteins, dairy whey proteins, non-dairy whey proteins, vegetable whey proteins, coffee, coffee solids, vegetable juice, vegetable puree, tea, tea solids, preservatives, buffers, colors, flavors, and combinations thereof.

25. The beverage according to claim 23, wherein xanthan gum is present in an amount ranging from about 0.025% to about 0.055% by weight of the beverage, gellan gum is present in an amount ranging from about 0.008% to about 0.023% by weight of the beverage and pectin gum is present in an amount ranging from about 0.10% to about 0.30% by weight of the beverage.

26. The beverage according to claim 25, wherein xanthan gum is present in an amount of about 0.04% by weight of the beverage, gellan gum is present in an amount of about 0.015% by weight of the beverage and pectin gum is present in an amount of about 0.2% by weight of the beverage.

27. The beverage according to claim 23, wherein a viscosity of the beverage ranges from about 50 cP to about 60 cP at about 80° F.

28. The beverage according to claim 23, wherein the beverage is stable for a period of at least six months.

29. The beverage according to claim 23, wherein the beverage is a smoothie beverage.

30. The beverage according to claim 29, wherein the smoothie beverage is a fruit smoothie beverage.

31. A beverage comprising:
 (a) xanthan gum in an amount ranging from about 0.002% to about 0.5% by weight of the beverage;
 (b) gellan gum in an amount ranging from about 0.002% to about 0.5% by weight of the beverage; and
 (c) pectin gum in an amount ranging from about 0.05% to about 2.0% by weight of the beverage; wherein a viscosity of the beverage ranges from about 40 cP to about 75 cP at about 80° F.
wherein the beverage is a smoothie beverage.

32. The beverage according to claim 31 further comprising other beverage ingredients selected from the group consisting of sweeteners, acids, vitamins, fiber, fruit juice, fruit puree, milk, milk solids, milk proteins, soy milk, soy proteins, egg proteins, albumins, microbial proteins, fish proteins, plant proteins, dairy whey proteins, non-dairy whey proteins, vegetable whey proteins, coffee, coffee solids, vegetable juice, vegetable puree, tea, tea solids, preservatives, buffers, colors, flavors, and combinations thereof.

33. The beverage according to claim 31, wherein xanthan gum is present in an amount ranging from about 0.025% to about 0.055% by weight of the beverage, gellan gum is present in an amount ranging from about 0.008% to about 0.023% by weight of the beverage and pectin gum is present in an amount ranging from about 0.10% to about 0.30% by weight of the beverage.

34. The beverage according to claim 33, wherein xanthan gum is present in an amount of about 0.04% by weight of the beverage, gellan gum is present in an amount of about 0.015% by weight of the beverage and pectin gum is present in an amount of about 0.2% by weight of the beverage.

* * * * *